(12) United States Patent
Li

(10) Patent No.: US 11,806,612 B2
(45) Date of Patent: Nov. 7, 2023

(54) VIDEO GAME CONTROLLER WITH TRIGGERS

(71) Applicant: SHENZHEN ONEBITDO TECH CO., LTD., Guangdong (CN)

(72) Inventor: Chuankun Li, Shenzhen (CN)

(73) Assignee: SHENZHEN BESTODO TECH CO., LTD., Shenzhen (CN)

( * ) Notice: Subject to any disclaimer, the term of this patent is extended or adjusted under 35 U.S.C. 154(b) by 0 days.

(21) Appl. No.: 16/965,020

(22) PCT Filed: Jul. 16, 2019

(86) PCT No.: PCT/CN2019/096095
§ 371 (c)(1),
(2) Date: Jul. 27, 2020

(87) PCT Pub. No.: WO2021/003756
PCT Pub. Date: Jan. 14, 2021

(65) Prior Publication Data
US 2022/0347560 A1  Nov. 3, 2022

(30) Foreign Application Priority Data

Jul. 11, 2019 (CN) .......................... 201910625581.0

(51) Int. Cl.
*A63F 13/24* (2014.01)
*A63F 13/98* (2014.01)

(52) U.S. Cl.
CPC .............. *A63F 13/24* (2014.09); *A63F 13/98* (2014.09)

(58) Field of Classification Search
None
See application file for complete search history.

(56) References Cited

U.S. PATENT DOCUMENTS

| 9,174,134 B1* | 11/2015 | Grant ....................... G06F 3/016 |
| 2002/0155868 A1* | 10/2002 | Koshima ................. A63F 13/42 463/1 |
| 2007/0281787 A1* | 12/2007 | Numata ................ A63F 13/218 463/36 |
| 2012/0322555 A1* | 12/2012 | Burgess ................. A63F 13/24 463/37 |
| 2014/0315642 A1* | 10/2014 | Grant .................... A63F 13/285 345/184 |
| 2014/0357371 A1* | 12/2014 | Lee ......................... A63F 13/24 463/37 |
| 2016/0151706 A1* | 6/2016 | Antonio .................. A63F 13/98 463/37 |
| 2016/0256772 A1* | 9/2016 | Kissoon .................. A63F 13/24 |
| 2016/0320858 A1* | 11/2016 | Rubio ..................... A63F 13/22 |
| 2016/0320859 A1* | 11/2016 | Rubio ..................... A63F 13/24 |

(Continued)

*Primary Examiner* — Tramar Harper

(57) ABSTRACT

A trigger button and a video game controller with triggers are provided in the invention, which relates to the technical field of video game controller. A trigger button is provided, which includes a mounting base and a pressing cap. The mounting base is connected to a casing of a video game controller, and the pressing cap is detachably connected to the mounting base. Through the rotational connection of the pressing cap and the mounting base, the connection of the pressing cap and the mounting base is achieved while increasing the flexibility of the connection between the pressing cap and the mounting base.

5 Claims, 7 Drawing Sheets

(56) References Cited

U.S. PATENT DOCUMENTS

| | | | | |
|---|---|---|---|---|
| 2016/0325177 A1* | 11/2016 | Antonio | .................. | A63F 13/24 |
| 2016/0361639 A1* | 12/2016 | Schmitz | .................. | A63F 13/24 |
| 2017/0151494 A1* | 6/2017 | Ironmonger | ........... | H01H 21/24 |
| 2017/0212548 A1* | 7/2017 | Sato | ........................ | G06F 3/016 |
| 2018/0011242 A1* | 1/2018 | Morita | ................. | G02B 6/0036 |
| 2018/0018020 A1* | 1/2018 | Grant | .................... | G06F 3/0338 |
| 2018/0140943 A1* | 5/2018 | Ironmonger | ........... | G06F 3/0338 |
| 2018/0250587 A1* | 9/2018 | Strahle | .................... | A63F 13/25 |
| 2018/0345134 A1* | 12/2018 | Schmitz | .................. | G06F 3/016 |
| 2021/0060418 A1* | 3/2021 | Kawashima | ........... | A63F 13/285 |
| 2021/0093950 A1* | 4/2021 | Duncan | ................. | G06F 3/0338 |
| 2021/0394047 A1* | 12/2021 | Orion | .................... | A63F 13/24 |
| 2022/0305375 A1* | 9/2022 | Morita | ................. | A63F 13/218 |

\* cited by examiner

VIDEO GAME CONTROLLER WITH TRIGGERS

BACKGROUND OF THE INVENTION

Field of the Invention

The invention relates to the technical field of video game controllers, and particularly relates to a trigger button and a video game controller with triggers.

Description of Related Art

Typically, in order to facilitate the operation and improve the accuracy when the finger presses the button on the video game controller, a vertical trigger button is mounted on the index finger location in the front side of the video game controller. Under normal circumstances, players do not use fingertips to press it, but can use the index finger to bend naturally to hook, thereby reducing input errors. However, the trigger button is usually mounted on the video game controller, and the shape of the trigger button is unique, thus, if the trigger button needs to be replaced, the video game controller needs to be disassembled.

SUMMARY OF THE INVENTION

The present invention has been completed in view of the status of the above-mentioned prior art, and its objective is to provide a trigger button to solve the problem of difficulty in replacing the trigger button.

A trigger button is provided in the invention, which includes a mounting base and a pressing cap. The mounting base is connected to a casing of a video game controller with triggers, and the pressing cap is detachably connected to the mounting base.

In one embodiment, the mounting base and the pressing cap are respectively provided with a shaft and a shaft connecting portion that are matched with each other, and the shaft is rotatably connected to the shaft connecting portion.

In one embodiment, the trigger button further includes a supporting base connected to the mounting base, a supporting pillar matching with the supporting base is disposed on the pressing cap, and the supporting base contacts the supporting pillar when the pressing cap is pressed.

In one embodiment, the supporting base is slidably connected to the mounting base, and the supporting base and/or the supporting pillar at least comprises two supporting surfaces with different supporting heights.

In one embodiment, the supporting base and the mounting base are respectively provided with a latch and a chute, the latch is plugged and mated with the chute, and the latch is slidably connected to the chute.

In one embodiment, a toggle switch is disposed on the supporting base, the mounting base is opened with an escape hole, the toggle switch is exposed outside the escape hole, and the toggle switch is adapted to adjust a position of the latch in the chute.

Compared with the prior art, the trigger button provided by the invention has the following advantages:

(1) Through the rotational connection of the pressing cap and the mounting base, the connection of the pressing cap and the mounting base is achieved while increasing the flexibility of the connection between the pressing cap and the mounting base.

(2) The advantage of designing the supporting surface of the supporting base and the supporting pillar as a stepped shape is that: more combined support height adjustments may be achieved by switching the supporting surfaces of different supporting bases and supporting pillars, so that the angle of the trigger button may be switched without removing the pressing cap.

A video game controller with triggers is further provided in the invention, the video game controller including the above trigger button.

In one embodiment, the video game controller further includes a telescopic assembly disposed within the casing of the video game controller, the telescopic assembly includes at least two supporting portions along a telescopic direction, the mounting base is provided with a supporting leg, and the supporting portions are adapted to support the supporting leg.

In one embodiment, the telescopic assembly includes a guide member, a pressing push rod, a rotation member, a compression spring and a fixed base; the guide member is fixedly connected to the casing of the video game controller, and the compression spring is located between the rotation member and the fixed base; the guide member is annular, and a guide groove is disposed on an inner wall of the guide member; at least two abutting portions are circumferentially disposed on the guide member, and abutting members matching the abutting portions are disposed on the rotation member; the compression spring pushes the abutting portions into contact with the abutting members, and the pressing push rod is slidably connected with the guide member; when the pressing push rod is pressed, the pressing push rod pushes the rotation member to move linearly; when the pressing push rod moves to a set position, the rotation member rotates under the action of the compression spring.

In one embodiment, the supporting portion includes a first cylindrical surface and a second cylindrical surface; the first cylindrical surface is disposed on the rotation member, and the second cylindrical surface is disposed on the fixed base; axial directions of the first cylindrical surface and the second cylindrical surface are the same as the telescopic direction of the telescopic assembly.

Compared with the prior art, the video game controller with triggers provided by the invention has the following advantages:

Through the provision of different supporting portions, the adjustment of different angles of the pressing cap at the limit position is realized; the players may choose the appropriate button-stroke and angle of the pressing cap according to their own needs, so that the same video game controller may meet the needs of different players without the need to repeatedly change the trigger button for the same product. The working principle similar to the ballpoint pen is used to adjust the button-stroke of the trigger button, and the first cylindrical surface and the second cylindrical surface are used as the supporting portion, which is convenient for adjustment.

BRIEF DESCRIPTION OF THE DRAWINGS

The drawings constituting a part of the invention are used to provide a further understanding of the invention. The embodiments and descriptions of the invention are used to explain the invention and do not constitute an inappropriate limitation on the invention. In the drawings.

DETAILED DESCRIPTION OF THE EMBODIMENTS

It should be noted that, in the case of no conflicts, the embodiments and features in the embodiments of the invention can be combined mutually.

In the description of the invention, it should be understood that, the front side is the side where the trigger button is disposed on the video game controller; the side facing upward when the player is playing the game is the upper side; the left side of the human hand is the left side; the lower side is opposite to the upper side; the left side is opposite to the right side, and the front side is opposite to the back side; orientations or position relationships indicated by terms "up", "down", "front", "back", "left", "right", and the like are orientations or position relationships shown in the accompanying drawings, and these terms are merely used to facilitate description of the present invention and simplify the description, but not to indicate or imply that the mentioned apparatus or element must have a specific orientation and must be constructed and operated in a specific orientation. Therefore, these terms cannot be understood as a limitation to the present invention. In addition, features limited to "first", "second", etc. do not constitute a limitation on a specific number. In the invention, unless otherwise stated, the meaning of 'a plurality of' is two or more.

In the description of the invention, it should be noted that, unless clear regulation and limitation otherwise, terms "mounting", "connected" and "connection" should be understood broadly, for example, may be fixed connection and also may be detachable connection or rotatable connection; may be mechanical connection; and may be direct connection, also may be indirection connection through an intermediary, and also may be communication of interiors of two components. The ordinary artisans concerned may understand the specific meaning of terms in this invention according to specific circumstance. The invention is described in detail with reference to drawings and with combination of embodiments.

Figure 1:
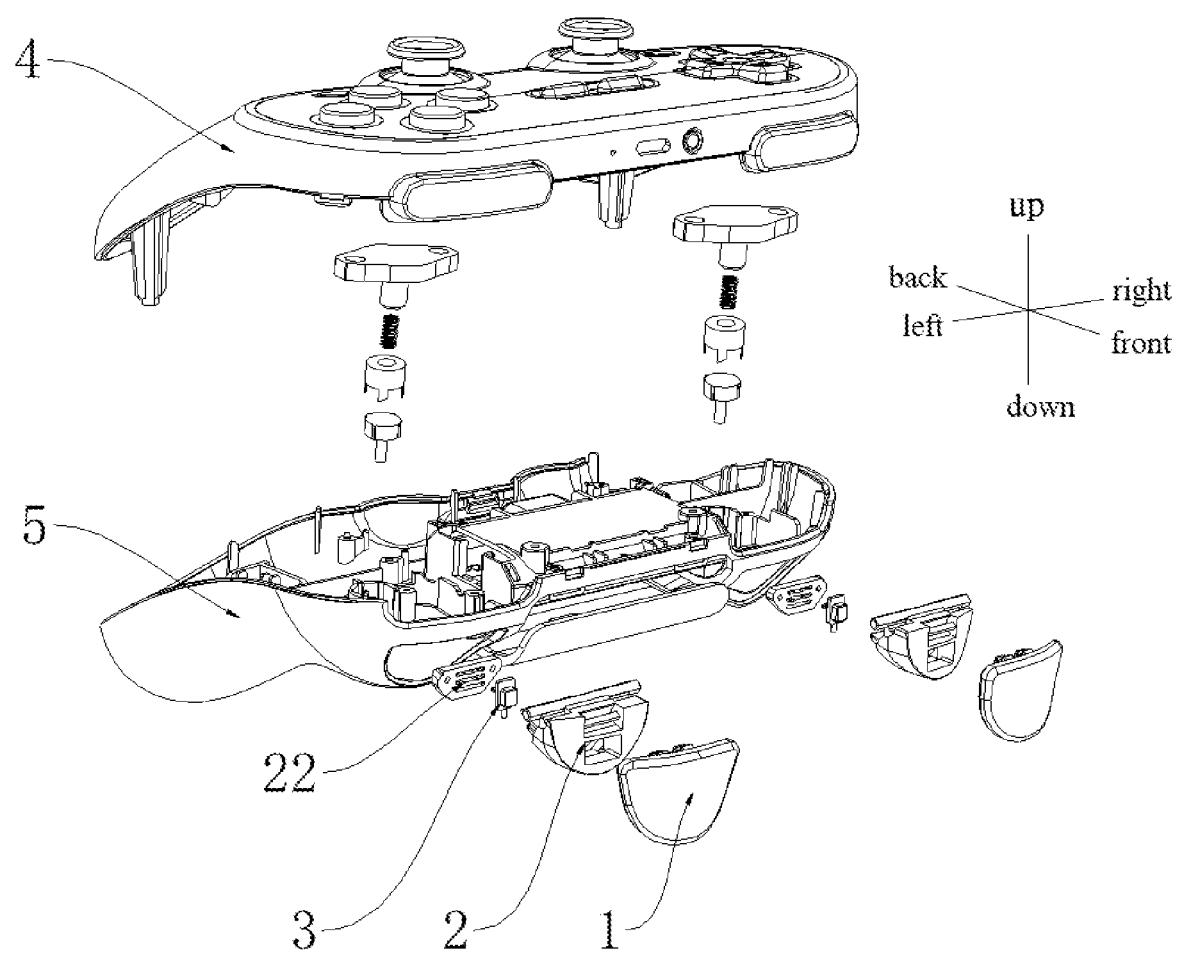
FIG. 1 is a structural exploded diagram of a video game controller with triggers according to an embodiment of the invention.
Figure 2:
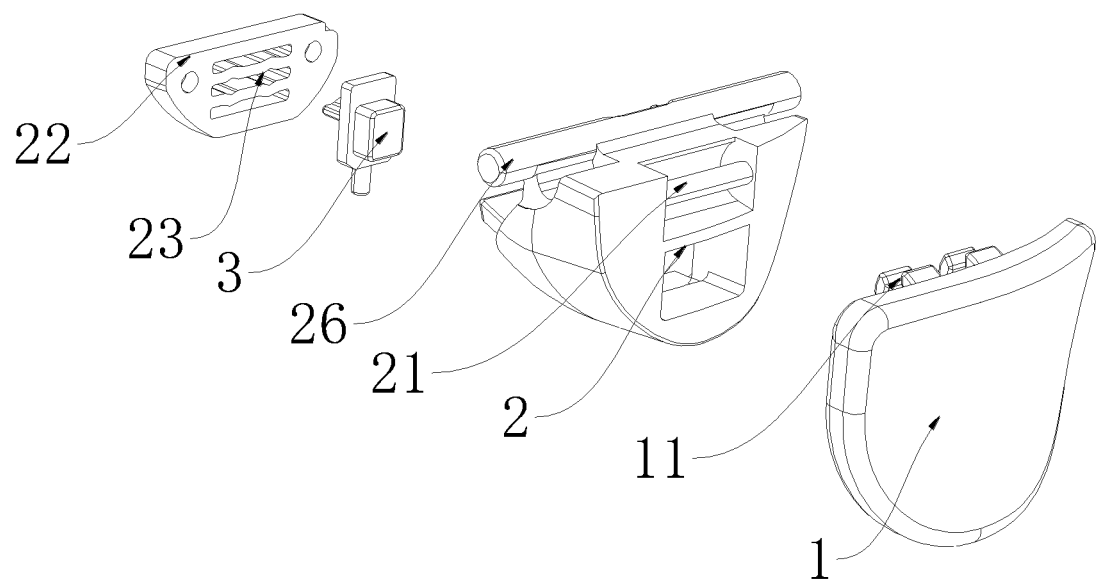
FIG. 2 is an exploded diagram of a trigger button according to an embodiment of the invention.

This embodiment provides a trigger button, as shown in FIGS. 1 and 2, including a mounting base 2 and a pressing cap 1. The mounting base 2 is connected to a casing of a video game controller, and the pressing cap 1 is detachably connected to the mounting base 2.

The traditional trigger button is an integral structure, which is fixedly connected or rotationally connected to the video game controller. For different players, they have different requirements for the angle of the pressing portion of the trigger button, but the installation and replacement of the traditional trigger button requires the video game controller to be disassembled. In this invention, the trigger button is divided into two parts, including the mounting base 2 located underneath and the conventional pressing cap 1 which provides a pressing portion. In this embodiment, the mounting base 2 is similar to the traditional mounting base, and it may be fixedly or rotationally connected to the casing of the video game controller; and the pressing cap 1 is detachably connected to the mounting base 2. The detachable connection here may include any method such as snap connection, screw connection or magnetic attraction. Thus, the pressing cap 1 is located above the mounting base 2 and located on the outside of the video game controller. For different pressing caps, different pressing angles may be set; the pressing cap may be designed in different shapes to meet the pressing habits of different players.

The advantage of this setting is that: through the detachable connection between the pressing cap 1 and the mounting base 2, there is no need to disassemble the video game controller when the player needs to replace the pressing cap, and the pressing cap 1 is directly removed to replace the different pressing caps.

Figure 3:
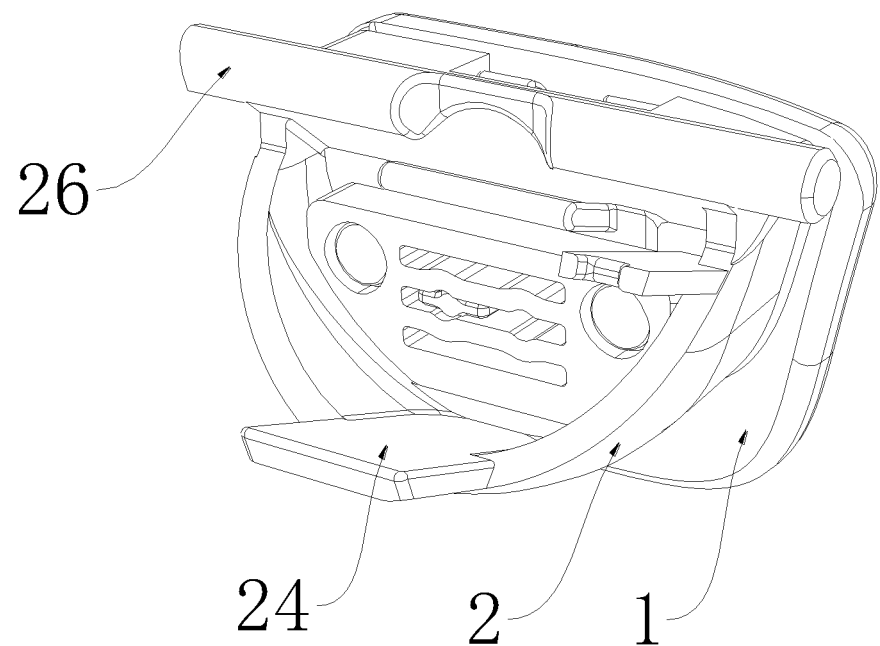
FIG. 3 is an assembly structural diagram of a trigger button according to an embodiment of the invention.

As shown in FIGS. 2 and 3, the mounting base 2 and the pressing cap 1 are respectively provided with a shaft 21 and a shaft connecting portion 11 that are matched with each other, and the shaft 21 is rotatably connected to the shaft connecting portion 11.

Through the insertion of the shaft 21 into the shaft connection portion 11, the rotatable connection between the pressing cap 1 and the mounting base 2 is realized. It should be noted that, in one embodiment, the shaft 21 is disposed on the pressing cap 1, and the shaft connection portion 11 is disposed on the mounting base 2; in another embodiment, the shaft 21 is disposed on the mounting base 2, and the shaft connection portion 11 is disposed on the pressing cap 1. Certainly, in other embodiments, the shaft connecting portion 11 may be disposed on the pressing cap 1 and the mounting base 2 at the same time, and the shaft is simultaneously inserted into a shaft mounting portion on the pressing cap 1 and the mounting base 2.

The advantage of this design is that: through the rotational connection of the pressing cap 1 and the mounting base 2, the connection of the pressing cap 1 and the mounting base 2 is achieved while increasing the flexibility of the connection between the pressing cap 1 and the mounting base 2.

As shown in FIGS. 2 to 6, the trigger button further includes a supporting base 3 connected to the mounting base 2, and the pressing cap 1 is provided with a supporting pillar 12 matching with the supporting base 3, so that the supporting base 3 contacts the supporting pillar 12 when the pressing cap 1 is pressed.

As mentioned in the foregoing embodiment, different-shaped pressing caps may be provided, and different angles may be adjusted by replacing different pressing caps. The supporting base 3 is disposed in the mounting base 2, and the supporting pillar 12 is disposed on the pressing cap 1, so that the supporting base 3 contacts the supporting pillar 12 when the pressing cap 1 is pressed. For different trigger buttons, the supporting pillar 12 may be set to different heights, so as to realize the adjustment of different angles of the pressing cap.

Figure 4:
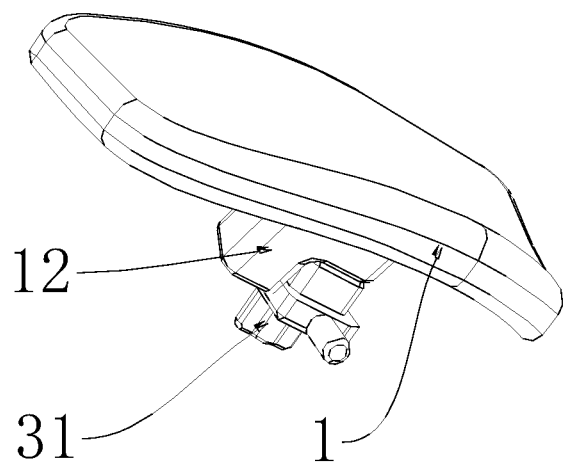
FIG. 4 is a diagram showing cooperation between a pressing cap and a supporting base according to an embodiment of the invention.
Figure 5:
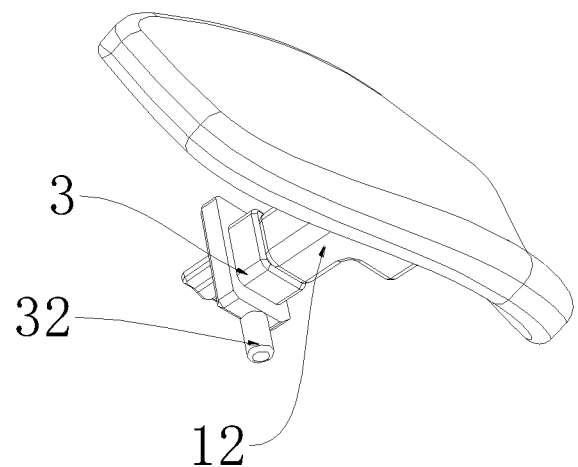
FIG. 5 is another diagram showing cooperation between a pressing cap and a supporting base according to an embodiment of the invention.

As shown in FIGS. 4 and 5, the supporting base 3 is slidably connected to the mounting base 2, and the supporting base 3 and/or the supporting pillar 12 at least includes two supporting surfaces with different supporting heights. It should be noted that the supporting surfaces with different supporting heights mean that the supporting heights of different supporting surfaces are different, so that the pressing angle of the trigger button is different.

It should be noted that there are many cases: the supporting surface of the supporting base 3 may be set to a shape with a different supporting height, similar to a stepped shape; the supporting surface of the supporting pillar 12 may also be set in a shape with different supporting heights, similar to a stepped shape; and also, the above two may be set to a stepped shape simultaneously. Through the slidable connection of the supporting base 3 and the mounting base 2, switching between different supporting heights is realized. The advantage for simultaneously designing the supporting surface of the supporting base 3 and the supporting surface of the supporting pillar 12 with a stepped shape is that: more combinations of supporting height adjustments may be achieved by switching the supporting surfaces of different supporting bases 3 and supporting pillars 12, so that the angle of the trigger button may be switched without disassembling the pressing cap.

As shown in FIGS. 2 and 3, the supporting base 3 and the mounting base 2 are respectively provided with a latch 31 and a chute 23, the latch 31 is plugged and mated with the chute 23, and the latch 31 is slidably connected to the chute 23.

It should be noted that, in one embodiment, a latch 31 is disposed on the supporting base 3, and a chute 23 is disposed on the mounting base 2; in another embodiment, a chute 23 is disposed on the supporting base 3, and a latch 31 is disposed on the mounting base 2. As shown in FIGS. 2 and 3, the mounting base 2 includes a mounting plate 22, and the mounting plate 22 may be fixedly connected to the body of the mounting base or integrally formed therewith. The mounting plate 22 is provided with the chute 23, and a chute 31 is inserted into the chute 23 and may slide along the chute 23. Through the sliding of the latch 31 in the chute 23, different supporting heights of the supporting base 3 are adjusted to adjust the angle of the trigger button.

Figure 6:
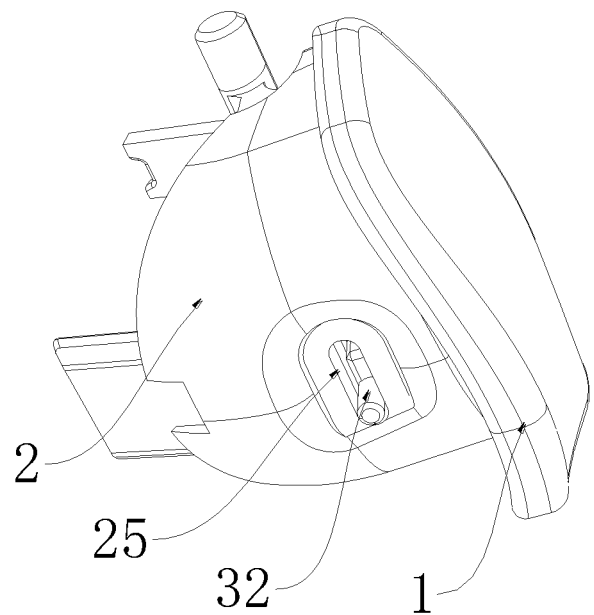
FIG. 6 is an assembly structural axis-side diagram of a trigger button according to an embodiment of the invention.

As shown in FIGS. 5 and 6, a toggle switch 32 is disposed on the supporting base 3, the mounting base 2 is opened with an escape hole 25, the toggle switch 32 is exposed outside the escape hole 25, and the toggle switch 32 is adapted to adjust a position of the latch 31 in the chute 23.

In other words, the supporting base 3 is disposed inside the mounting base 2. In order to facilitate adjustment, the toggle switch 32 is arranged such that the toggle switch 32 is exposed from the mounting base 2. By pushing the toggle switch 32, the position of the supporting base 3 in the mounting base 2 may be adjusted, or the position of the supporting base in the chute 23 may be adjusted. At a corresponding position of the toggle switch 32, an escape hole for evading the toggle switch 32 is opened, wherein the escape hole is a strip-shaped hole, and the longitudinal direction of the strip-shaped hole is parallel to the chute 23.

As shown in FIG. 1, a video game controller with triggers is provided in this embodiment, including one of the above trigger buttons. The beneficial effects of the video game controller are the same as the trigger buttons described above, and will not be repeated here.

As shown in FIGS. 7 to 12, the video game controller further includes a telescopic assembly 6 disposed inside the casing of the video game controller. The telescopic assembly 6 includes at least two supporting portions along a telescopic direction, and a supporting leg 24 is disposed on the mounting base 2, so that the supporting portion contacts the supporting leg 24 when the pressing cap 1 is pressed to a limit position. The limit position here refers to the position at the maximum displacement that may be moved by pressing the pressing cap 1.

As shown in FIG. 1, the trigger button is disposed at a front end of the video game controller, the telescopic direction of the telescopic assembly 6 is arranged up and down, and the telescopic assembly 6 includes at least two supporting portions along the telescopic direction. Through the provision of the supporting leg 24 on the mounting base 2, limitation may be exerted on the supporting leg 24 in different supporting portions, thereby adjusting the pressing stroke of the pressing cap. Through different pressing strokes, the requirements of different players may be met. In other words, through the provision of different supporting portions, the adjustment for different angles of the pressing cap may be realized at the limit position.

Figure 10:
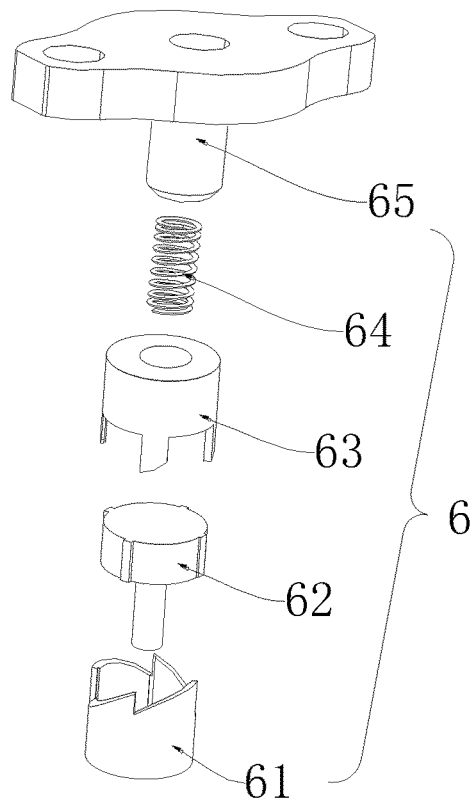
FIG. 10 is an exploded diagram of a telescopic assembly according to an embodiment of the invention.
Figure 11:
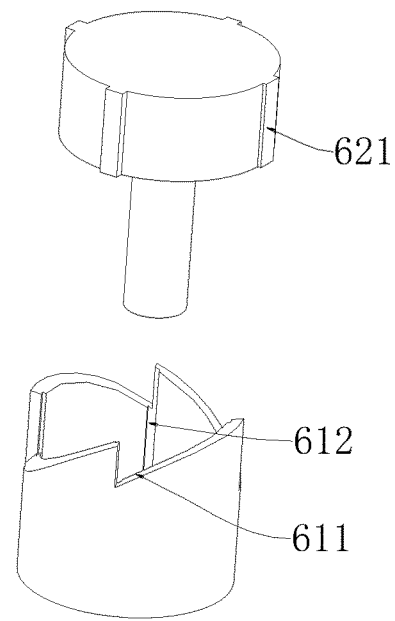
FIG. 11 is a diagram showing cooperation between a guide member and a pressing push rod according to an embodiment of the invention.
Figure 12:
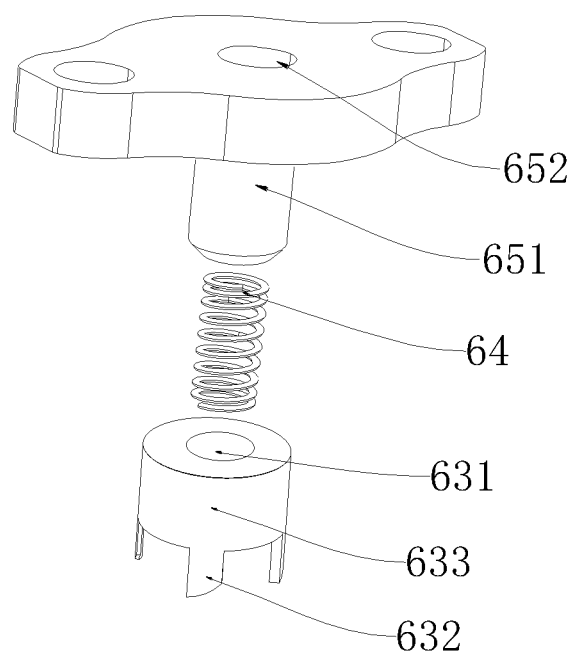
FIG. 12 is a diagram showing cooperation between a rotation member and a fixed base according to an embodiment of the invention.

As shown in FIGS. 10 to 12, the telescopic assembly 6 includes a guide member 61, a pressing push rod 62, a rotation member 63, a compression spring 64 and a fixed base 65. The guide member 61 is fixedly connected to the casing of the video game controller, and the compression spring 64 is located between the rotation member 63 and the fixed base 65. The guide member 61 is annular, and an inner wall of the guide member 61 is provided with a guide groove 612. The guide member 61 is provided circumferentially with at least two abutting portions 611, and the rotation member 63 is provided with abutting members 632 matching the abutting portions 611. The compression spring pushes the abutting portions 611 into contact with the abutting members 632, and the pressing push rod 62 is slidably connected with the guide member 61. When the pressing push rod 62 is pressed, the pressing push rod 62 pushes the rotation member 63 to move linearly. When the pressing push rod 62 moves to a set position, the rotation member 63 rotates under the action of the compression spring.

It should be noted that, in this embodiment, as shown in FIG. 1, the video game controller includes an upper casing 4 and a lower casing 5. The telescopic assembly 6 adopts the working principle of a telescopic ballpoint pen. When the ballpoint pen is pressed, the pen head extends; and when the ballpoint pen is pressed again, the pen head retracts. As shown in FIGS. 10 to 12, in this embodiment, the guide member 61 is mounted on the lower casing 5, and an inner wall of the guide member is provided with a guide groove 612; the pressing push rod 62 also has a cylindrical surface matching the inner wall of the guide member, and the circumferential surface of the pressing push rod 62 is provided with a guide protrusion 621. The guide protrusion 621 is slidably connected to the guide groove 612, and the cross-sectional projection of the abutting portion 611 is a right triangle, or the abutting portion 611 has a right-angled tooth shape, and the contact surface between the abutting portion 611 and the abutting member 632 is an arc-shaped surface or an inclined surface. The guide groove 612 is located between adjacent abutting portions 611. When the pressing push rod 62 pushes the rotation member 63 to make a linear movement, and when the rotation member 63 reaches the uppermost end of the abutting portion 611 (i.e., the set position), the rotation member 63 moves along the contact surface of the abutting portion to the adjacent abutting portion 611 under the action of the compression spring 64, thereby achieving the rotation of the rotation member 63. The height of the position where the abutting portion 611 contacts the abutting member 632 is different, and the height of the rotation member 63 is adjusted by different heights. The height of the position where the abutting portion 611 contacts the abutting member 632 has at least two different heights. The fixed base 65 is mounted on the upper casing 4, a lower end of the fixed base 65 is provided with a spring receiving groove 652 (in the figure, the spring receiving groove 652 is shown as penetrating through the fixed base 65, but in reality, it may be partially penetrated through the fixed base 65), and the compressing spring is received in the spring receiving groove 652, so that a limitation is exerted on the compressing spring. It should be noted that an initial length of the compression spring is greater than a depth of the spring receiving groove. The pressing portion of the pressing push rod 62 is located on a lower side of the lower casing 5.

Figure 7:
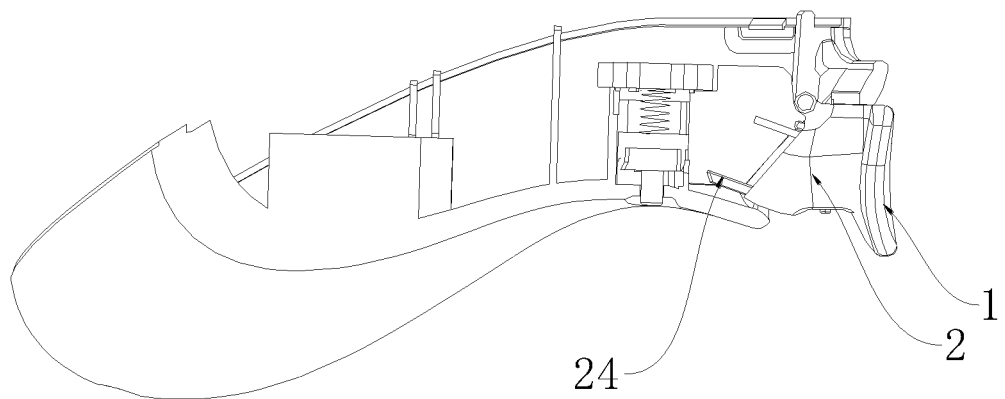
FIG. 7 is a diagram showing an initial position of a trigger button according to an embodiment of the invention.
Figure 8:
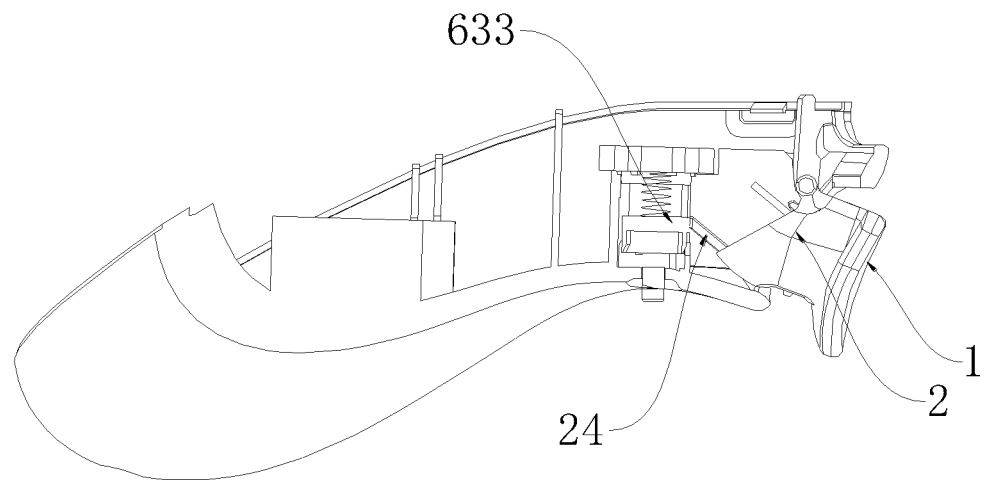
FIG. 8 is a diagram showing a state in which a trigger button is pressed to a limit position according to an embodiment of the invention.
Figure 9:
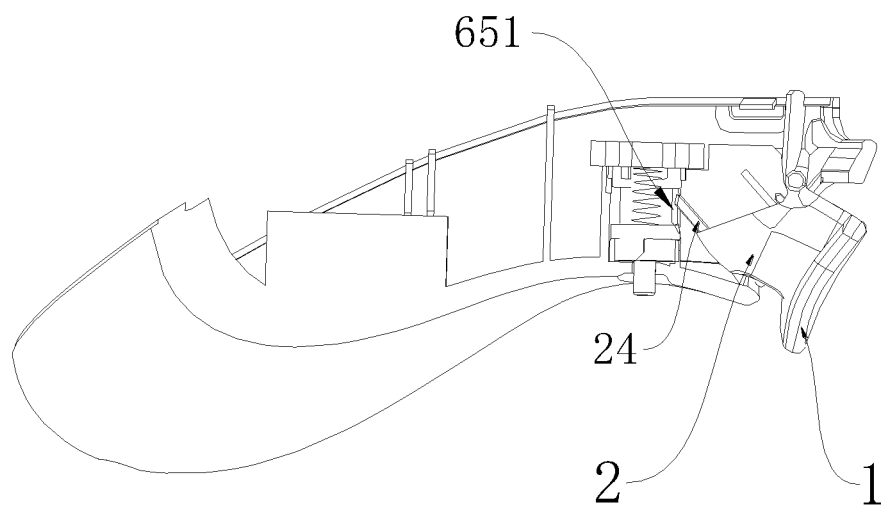
FIG. 9 is a diagram showing another state in which a trigger button is pressed to a limit position according to an embodiment of the invention.

As shown in FIGS. 10 to 12, a cylindrical groove 631 is disposed on an upper end of the rotation member 63, the second cylindrical surface 651 is disposed on the fixed base 65, and the second cylindrical surface 651 is inserted into the cylindrical groove 631, so that the compression spring is located between the spring receiving groove 652 and the cylindrical groove 631. FIG. 7 is a view showing a state of un-pressing the trigger button, FIG. 8 is a view showing a state where the trigger button is pressed to a limit position, and the FIG. 9 is a view showing another state where the trigger button is pressed to a limit position. The supporting portion includes a first cylindrical surface 633 and a second cylindrical surface 651; the first cylindrical surface 633 is disposed on the rotation member 63, and the second cylindrical surface 651 is disposed on the fixed base 65; axial directions of the first cylindrical surface 633 and the second cylindrical surface 651 are the same as the telescopic direction of the telescopic assembly 6.

As shown in FIG. 7, a rotation shaft 26 is disposed on the mounting base 2, and the trigger button is connected to the upper casing through the rotation shaft. When the trigger button is pressed, the trigger button rotates around the rotation shaft 26; and when the trigger button is released, the trigger button is restored to the initial position automatically. As shown in FIG. 8, when the trigger button is pressed, the supporting portion is the first cylindrical surface 633; and when the trigger button is at the limit position, the supporting leg 24 contacts the first cylindrical surface 633, which is equivalent to the first cylindrical surface 633 limiting a first button stroke of the trigger button. As shown in FIG. 9, the pressing push rod is pressed to switch the button strokes of the trigger button. At this time, when the trigger button is pressed, the supporting portion is the second cylindrical surface 651; and when the trigger button is at the limit position, the supporting leg 24 contacts the second cylindrical surface 651, which is equivalent to the second cylindrical surface 651 limiting a second button stroke of the trigger button.

Optionally, the diameters of the first cylindrical surface 633 and the second cylindrical surface 651 are different. Through setting different diameters, different positions of the supporting leg 24 are defined.

The advantage of the setting is that: the players may choose the appropriate button-stroke and angle of the pressing cap according to their own needs, so that the same video game controller may meet the requirements of different players without repeatedly changing the trigger button for the same product. The working principle similar to the ballpoint pen is used to adjust the button-stroke of the trigger button, and the first cylindrical surface 633 and the second cylindrical surface 651 are used as the supporting portions, which is convenient for adjustment.

It should be noted that the supporting portion may also have other shapes, such as polygonal surfaces or arc-shaped surfaces, etc., and is not necessarily limited to cylindrical surfaces. In this embodiment, the pressing signal is triggered by the contact between the supporting leg 24 and the supporting portion.

The above are only preferred embodiments of this invention and are not intended to limit this invention. Any modification, equivalent replacement, improvement, etc. made by any person skilled in the art within the spirit and principle of this invention should also be included in the scope of this invention.

What is claimed is:

1. A trigger button, comprising:
    a mounting base and a pressing cap, the mounting base being connected to a casing of a video game controller, the pressing cap being detachably connected to the mounting base;
    wherein the trigger button further comprises a supporting base connected to the mounting base, a supporting pillar matching with the supporting base is disposed on the pressing cap, and the supporting base contacts the supporting pillar when the pressing cap is pressed;
    wherein the supporting base is slidably connected to the mounting base, and the supporting base and/or the supporting pillar at least comprises two supporting surfaces with different supporting heights;
    wherein the supporting base and the mounting base are respectively provided with a latch and a chute, the latch is plugged and mated with the chute, and the latch is slidably connected to the chute.

2. The trigger button according to claim 1, wherein the mounting base and the pressing cap are respectively provided with a shaft and a shaft connecting portion that are matched with each other, and the shaft is rotatably connected to the shaft connecting portion.

3. The trigger button according to claim 1, wherein a toggle switch is disposed on the supporting base, the mounting base is opened with an escape hole, the toggle switch is exposed outside the escape hole, and the toggle switch is adapted to adjust a position of the latch in the chute.

4. A video game controller with triggers, comprising:
    a trigger button, comprising:
        a mounting base and a pressing cap, the mounting base being connected to a casing of the video game controller, the pressing cap being detachably connected to the mounting base;
    a telescopic assembly disposed within the casing of the video game controller, the telescopic assembly comprises at least two supporting portions along a telescopic direction, the mounting base is provided with a supporting leg, and the supporting portions are adapted to support the supporting leg;
    wherein the telescopic assembly comprises a guide member, a pressing push rod, a rotation member, a compression spring and a fixed base; the guide member is fixedly connected to the casing of the video game controller, and the compression spring is located between the rotation member and the fixed base; the guide member is annular, and a guide groove is disposed on an inner wall of the guide member; at least two abutting portions are circumferentially disposed on the guide member, and abutting members matching the abutting portions are disposed on the rotation member; the compression spring pushes the abutting portions into contact with the abutting members, and the pressing push rod is slidably connected with the guide member; when the pressing push rod is pressed, the pressing push rod pushes the rotation member to move linearly; when the pressing push rod moves to a set position, the rotation member rotates under the action of the compression spring.

5. The video game controller with triggers according to claim 4, wherein the supporting portion comprises a first cylindrical surface and a second cylindrical surface; the first cylindrical surface is disposed on the rotation member, and the second cylindrical surface is disposed on the fixed base; axial directions of the first cylindrical surface and the second cylindrical surface are the same as the telescopic direction of the telescopic assembly.

* * * * *